(12) United States Patent
Cartigny et al.

(10) Patent No.: US 8,544,381 B2
(45) Date of Patent: *Oct. 1, 2013

(54) FOOD PRESSURE-COOKING DEVICE WITH A COVER MODULE

(75) Inventors: Michel Pierre Cartigny, Mirebeau sur Beze (FR); Eric Chameroy, Veronnes (FR)

(73) Assignee: SEB S.A., Ecully (FR)

( * ) Notice: Subject to any disclaimer, the term of this patent is extended or adjusted under 35 U.S.C. 154(b) by 694 days.

This patent is subject to a terminal disclaimer.

(21) Appl. No.: 12/543,289

(22) Filed: Aug. 18, 2009

(65) Prior Publication Data

US 2009/0301311 A1 Dec. 10, 2009

Related U.S. Application Data

(62) Division of application No. 10/507,223, filed as application No. PCT/FR03/00756 on Mar. 10, 2003, now Pat. No. 7,669,521.

(30) Foreign Application Priority Data

Mar. 8, 2002 (FR) ...................................... 02 03089

(51) Int. Cl.
*A47J 27/092* (2006.01)

(52) U.S. Cl.
USPC ................ 99/337; 99/403; 219/440; 220/316

(58) Field of Classification Search
USPC ................... 99/337, 330, 338, 403; 220/316, 220/912; 219/440
See application file for complete search history.

(56) References Cited

U.S. PATENT DOCUMENTS

| | | | | |
|---|---|---|---|---|
| 4,711,366 A | * | 12/1987 | Chen | 220/316 |
| 4,733,795 A | * | 3/1988 | Boehm | 220/316 |
| 5,678,721 A | * | 10/1997 | Cartigny et al. | 220/316 |
| 6,705,209 B2 | * | 3/2004 | Yang et al. | 99/337 |

\* cited by examiner

*Primary Examiner* — Reginald L Alexander
(74) *Attorney, Agent, or Firm* — McClure, Qualey & Rodack, LLP

(57) ABSTRACT

Appliances for cooking food under pressure are disclosed herein. In one embodiment, an appliance comprises a vessel and a lid fitted and locked on the vessel in order to form a leaktight cooking enclosure. The appliance further comprises at least one jaw for locking the lid relative to the vessel and a device for driving the at least one jaw between a locking position and an unlocking position. The appliance also includes a module for fitting on and releasably securing to the lid. The module includes at least a device for controlling locking and unlocking of the lid relative to the vessel. Also disclosed are other alternatives applicable to domestic appliances for cooking food under pressure.

14 Claims, 3 Drawing Sheets

FOOD PRESSURE-COOKING DEVICE WITH A COVER MODULE

CROSS-REFERENCE TO RELATED APPLICATIONS

This application is a divisional of U.S. patent application Ser. No. 10/507,223, filed Mar. 23, 2005, which is a national stage application of International Application No. PCT/FR03/00756, filed Mar. 10, 2003, which claims priority to FR 02/03089, filed Mar. 8, 2002, all of which are hereby incorporated by reference in their entirety into the present application.

TECHNICAL FIELD

The present invention relates to the general technical field of domestic appliances for cooking under pressure and comprising a vessel and a lid for being locked on the lid to form a leaktight cooking enclosure, which appliances are intended to cook food contained in the vessel under steam pressure.

The present invention relates to a domestic appliance for cooking food under pressure of the pressure cooker type, and comprising at least:
- a vessel and a lid for being fitted and locked on said vessel in order to form a leaktight cooking enclosure;
- one or more jaws for locking the lid relative to the vessel; and
- drive means for driving said at least one jaw between a locking position and an unlocking position.

The present invention also relates to a module for a domestic appliance for cooking food, the module being for use mounted on a lid of an appliance for cooking under pressure.

PRIOR ART

Appliances for cooking under pressure are already known, in particular from patent application WO 96/01069 in the name of the same Applicant, such appliances comprising a vessel, a lid, and a device for locking the lid on the vessel and comprising:
- two jaws mounted to move radially in opposition on the lid between a position for locking the lid on the vessel and an unlocking position;
- control means for controlling movement of the jaws so as to cause them to take up one or other of their locking and unlocking positions;
- respective drive arms secured to the jaws, at least one of the arms being provided with a locking slot; and
- at least one locking valve suitable for co-operating with said locking slot to lock the jaws in the locking position.

The control means and also at least the locking valve are mounted on the lid of those prior art pressure cookers.

The lids of those prior art appliances consequently include a series of devices that perform various functions for the user, including at least the functions of controlling opening and closing or of providing safety on opening and closing in the event of closure being performed wrongly.

The lids of those known appliances may also include other devices performing other functions for the user, such as regulation, safety, or control functions.

The above-mentioned devices, which are mostly concerned either directly or indirectly with providing safety functions, must, so far as possible, be capable of avoiding being subjected to pointless temperature or mechanical stresses that might cause them to age prematurely or that might damage them.

Consequently, the presence of such devices on the lids of those prior art jaw pressure cookers, which otherwise give entire satisfaction, prevent such lids being washed frequently in a dishwasher, since the above-mentioned devices need to be preserved.

Furthermore, the functions that said devices perform, in particular the opening/closing functions, require parts of special shapes that present cavities, interstices, and corners which are liable to accumulate food and other residues, while being washed in a dishwasher. Naturally, the presence of such residues, after some length of time, can lead to the pressure cooker operating poorly, in particular from the point of view of safety in use.

In any event, the space occupied by those devices, even when all other considerations are ignored, makes it awkward to wash the lids of such prior jaw appliances in a dishwasher, and can even make washing in a dishwasher impossible.

In addition, the distinctive signs showing that the above-described prior art pressure cookers belong to some particular commercial range are generally situated on those parts that perform the above-mentioned functions for the user. Those parts lend themselves more easily than the lid itself, and at less expense, to being shaped, colored, or given some particular surface appearance, that enables a product to be clearly identified visually. For reasons of industrial standardization, it is then advantageous for a given size of pressure cooker to produce single designs for the lid and for the vessel, with different products being distinguished by fitting external parts, for example the parts that perform the functions for the user.

It thus turns out to be particularly advantageous to perform this industrial operation of distinguishing products as late as possible in order to benefit from the flexibility of a maximum amount of stock and in order to adjust the production of such and such a pressure cooker as closely as possible to market demand.

However, mounting control, regulation, and safety elements on the lid of a pressure cooker is generally complex from an industrial point of view, in particular given the very different natures of said elements and the lid, the elements generally being constituted by assemblies that are made for the most part out of plastics material requiring micromechanical skills, whereas the lid is obtained by a method of transforming metal requiring metallurgical skills. It is generally necessary to begin by providing the lid with the elements for performing the functions for the user at a relatively early stage in the production process.

Consequently, an industrial approach whereby products are distinguished at the very end of the process and in a length of time that is acceptable to avoid harming delivery deadlines turns out to be very difficult or even impossible to implement using prior art jaw-locked pressure cookers.

SUMMARY OF THE INVENTION

Consequently the objects given to the invention seek to remedy the various drawbacks mentioned above, and to propose a novel appliance for cooking under pressure that is closed by means of jaws, that is easy to clean, and that is of a design that enables products to be distinguished very flexibly and also facilitates assembly.

Another object of the invention is to propose a novel appliance for cooking under pressure and closed by means of jaws, that is of simplified design.

Another object of the invention is to propose a novel appliance for cooking under pressure and closed by means of jaws, that is particularly robust and compact.

Another object of the invention is to propose a novel appliance for cooking under pressure and closed by means of jaws, in which moving the jaws is facilitated.

Another object of the invention is to propose a novel appliance for cooking under pressure and closed by means of jaws, in which safety and reliability levels are improved.

The objects given to the invention are achieved with the help of an appliance for cooking food under pressure, the appliance comprising at least:

- a vessel and a lid for being fitted and locked on said vessel in order to form a leaktight cooking enclosure;
- one or more jaws for locking the lid relative to the vessel; and
- drive means for driving said at least one jaw between a locking position and an unlocking position;

the appliance being characterized in that it includes a module for fitting on and releasably securing to the lid, said module including at least a device for controlling locking and unlocking of the lid relative to the vessel.

The objects given to the invention are also achieved with the help of a module for an appliance for cooking food, the module being designed to be used and mounted on a lid of an appliance for cooking under pressure in accordance with the invention.

BRIEF DESCRIPTION OF THE DRAWINGS

Other particular objects and advantages of the invention will appear in greater detail on reading the following description, and from the accompanying purely illustrative and non-limiting drawings, in which.

BEST METHOD OF PERFORMING THE INVENTION

Figures 1, 2:
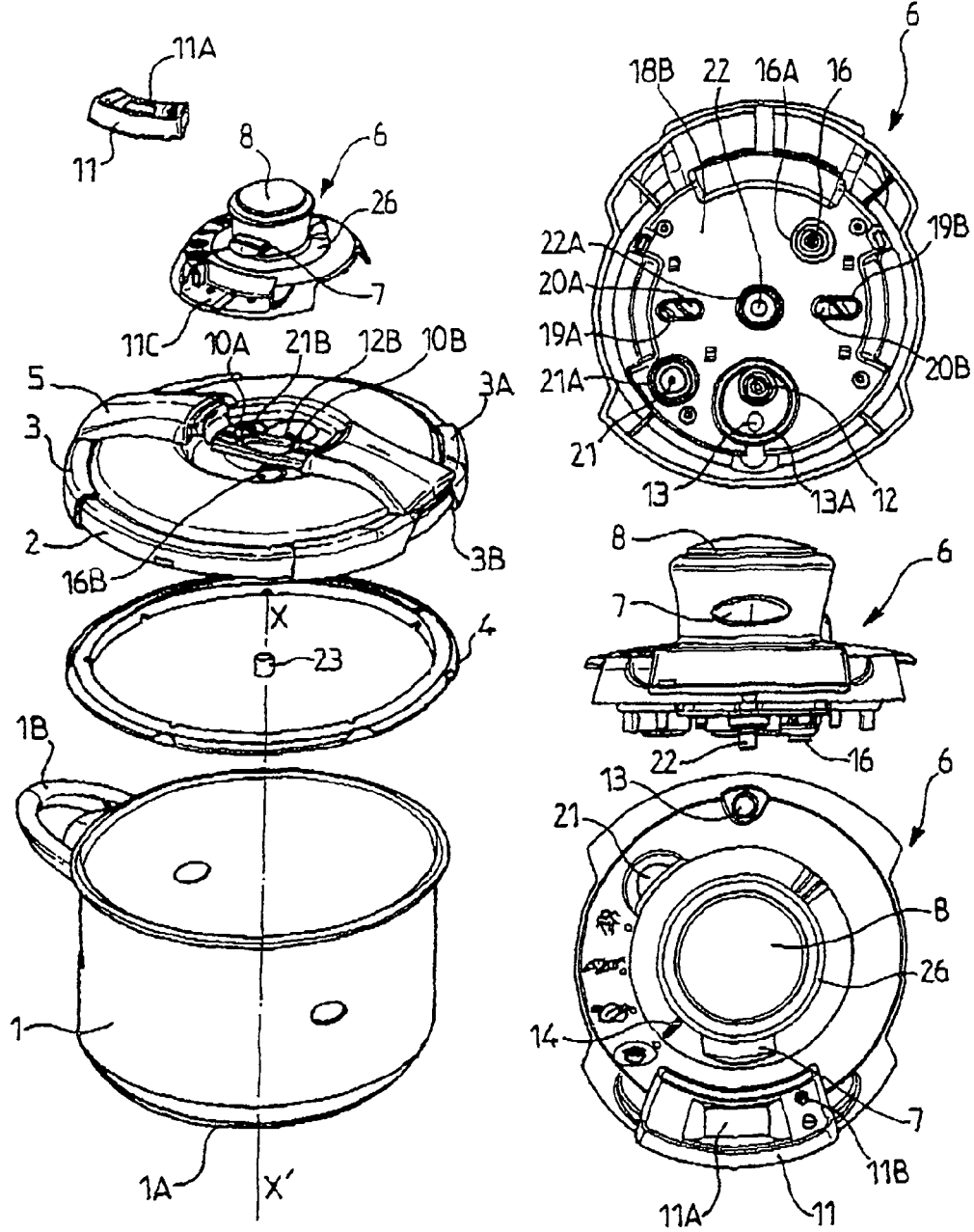
FIG. 1 is an exploded view in general perspective showing the various elements constituting a pressure cooker in accordance with the invention.
FIG. 2 shows a module for being fitted and removably secured to the lid of a pressure cooker in accordance with the invention, shown (from top to bottom) as seen from beneath, from the side, and from above.

The cooking appliance in accordance with the invention is intended to cook various kinds of food, under pressure, in a home or domestic context. The cooking appliance comprises a vessel 1 of substantially cylindrical shape about an axis of (circular) symmetry X-X', and is designed to receive a lid 2 in leaktight manner.

Below, the adjective "axial" refers to the direction of said axis of symmetry, which is close to the vertical when the pressure cooker is in normal operation.

In conventional manner, the vessel 1 is made of a metal material such as stainless steel and is provided with a heat-conductive bottom 1A secured to the vessel 1, e.g. by hot stamping.

The vessel 1 also has grip members such as handles 1B fixed on the walls of the vessel 1.

The lid 2 is generally disk-shaped, and it is locked on the vessel 1 by means of at least one jaw 3 mounted to move between a locking position in which the lid is secured to the vessel, and an unlocking position in which the lid can be withdrawn from the vessel.

In conventional manner, the jaw 3 is in the form of channel-section segments adapted to the shape of the receptacle, and in the example shown in the figures, in the form of circular arcs of determined length, and optionally notched.

The jaw 3 has a bottom rim 3B and a top rim 3A serving to clamp respectively against the peripheral rim of the vessel 1 and against the peripheral rim of the lid 2.

The appliance for cooking food under pressure of the invention comprises at least:

- a cooking vessel 1 and a lid 2 for fitting on the vessel 1 to form a leaktight cooking enclosure;
- one or more jaws 3 for locking the lid 2 relative to the vessel 1; and
- drive means 5 for driving said at least one jaw 3 between a locking position and an unlocking position.

Sealing is obtained by locking the lid 2 on the vessel 1, the lid 2 being provided with sealing means, e.g. constituted by an annular sealing gasket 4 of the lid.

According to an essential characteristic of the invention, the appliance for cooking under pressure includes at least one module 6 for being fitted and releasably secured on the lid 2.

In the meaning of the invention, the term "module" is used to designate an individual and unitary component, of the plate type, which is suitable for being intimately combined with the lid 2 so as to co-operate therewith to form a unitary assembly, optionally of one-piece nature.

In other words, the term "module" designates herein a substantially one-piece subassembly forming an identifiable unit which can be juxtaposed or combined with other component elements of the system formed by the pressure cooker.

The releasability of the module means that it can be put into place on the lid and removed easily and at will, optionally by means of suitable tooling, and preferably by hand.

According to an important characteristic of the pressure cooker appliance of the invention, the module 6 includes at least one device 7, 8, 17 for controlling locking and unlocking of the lid 2 relative to the vessel 1.

Thus, in the invention, the lid 2 and the module 6 are respectively provided with mechanical interfacing means 10A, 10B, 20A, 20B which co-operate when the module 6 is fitted on and secured to the lid 2 so that the locking or unlocking control delivered by the user is forwarded via the drive means 5 to the jaw(s) 3, causing it (them) to open (take up the unlocking position) or it (them) to close (take up the locking position), depending on the kind of order issued by the user.

Advantageously, the module 6 of the cooking appliance of the includes a timer 11. Preferably, the timer 11 is a timer that is fitted removably on the module 6 so that the user can extract it from the pressure cooker in order to keep it on or close to the user.

In the meaning of the invention, the term "timer" is used to mean any apparatus provided with means enabling time to be counted down, in any manner whatsoever (mechanical, electronic, or other). Preferably, the timer 11 is provided with a liquid crystal display (LCD) screen 11A for reading information (time in particular), and buttons 11B enabling various settings to be adjusted, e.g. duration.

Advantageously, the module 6 of the pressure cooker appliance incorporates a valve 12 for regulating pressure and fitted with a sealing gasket 12A. The term "incorporate" is used to mean that the pressure regulator valve 12 forms an integral portion of the module 6. The valve 12 is arranged within the module 6 in such a manner that when the module 6 is fitted on and secured to said lid 2, the valve is in leaktight communication with a regulator opening 12B formed in the lid 2. The valve 12 responds to the pressure that exists inside the cooking enclosure and is mounted to move between two stable abutment positions: a first position in which it closes off communication from the enclosure to the outside of the appliance so long as the internal pressure is lower than a predetermined pressure $P_1$; and a second position in which it puts the inside of the enclosure into communication with the outside of the appliance via a sealing outlet 13, once the internal pressure has substantially reached the predetermined pressure $P_1$.

In a preferred variant of the invention, the pressure $P_1$ is selected as being the normal cooking pressure of the pressure cooker.

Such valve devices are well known to the person skilled in the art, and seek to regulate the cooking pressure which must be kept below a predetermined threshold $P_1$, the value above which the valve 12 allows steam to leak out, thereby regulating the pressure inside the pressure cooker.

Figure 4:
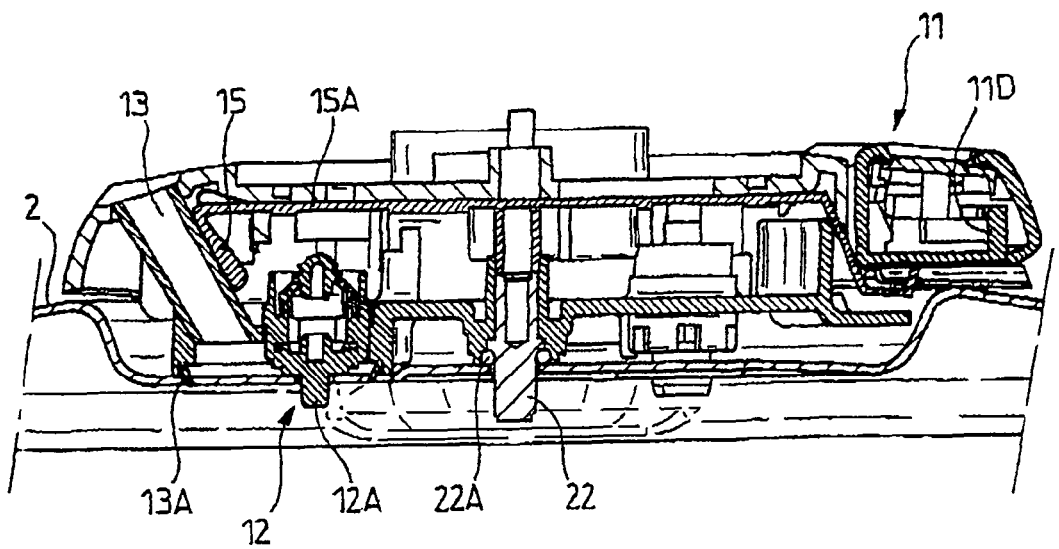
FIG. 4 is a fragmentary cross-section view showing the details of how a temperature sensor is assembled on a module of a lid of a pressure cooker in accordance with the invention.

As shown in FIG. 4, for example, the valve 12 may advantageously be a valve having a weight or a compression spring that is mounted to move in a well between a stable abutment position as shown in FIG. 4 in which it rests under its own weight against the seat formed around the regulator opening 12B pierced through the lid 2.

The valve 12 may also occupy a high abutment position (not shown in the figures) under the effect of the internal pressure of the pressure cooker in operation, when said pressure reaches or exceeds the predetermined operating value $P_1$. In this position, the valve 12 rises and disengages the regulator opening 12B, allowing steam to escape therethrough to the outside, through the opening 12B and a steam outlet 13 situated immediately at or close to said regulator opening 12B and in leaktight communication therewith ensured by a sealing gasket 13A.

As is well known to the person skilled in the art, the valve 12 may be provided with a rating system enabling the user to select a predetermined cooking pressure $P_1$ by selecting between two or more pressure levels via a pressure selector member 14 incorporated in the module 6, and as a function of the type of food present in the pressure cooker.

Advantageously, the module 6 incorporates one or more sensors for providing information concerning the physical conditions that exist inside the cooking enclosure. Such sensors can thus constitute a pressure sensor and/or a temperature sensor.

Preferably, the module 6 of the cooking appliance of the invention incorporates a temperature sensor 15 disposed close to the steam outlet 13 in order to sense the increase in temperature that results from steam passing through the steam outlet 13.

By means of this disposition, it is possible, in a manner that is particularly simple and reliable, to obtain information in real time that the temperature corresponding to the operating pressure has been reached, specifically, for example, the cooking temperature of the appliance, given that steam is released suddenly, which means that there is a sudden and fast rise in temperature once the valve 12 is triggered.

As shown in FIG. 4, the temperature sensor 15 is advantageously functionally connected to the timer 11 so as to cause it to start timing as soon as the temperature rise is sensed.

By means of this disposition, the timing of cooking is triggered automatically without any intervention on the part of the user.

The sensor 15 may advantageously be a sensor of the negative temperature coefficient (NTC) type functionally connected via suitable connection means 15A and via processing electronics to the timer 11.

Advantageously, the module 6 is provided with a housing 11C for receiving the timer 11. Preferably, the housing 11C is provided with at least one electrical connection tab functionally connected to the temperature sensor. In even more preferred manner, the at least one connection tab is a male connector 11D. It is thus particularly advantageous to provide the timer 11 with at least one female connector (not shown) for coming into contact with the at least one male connector 11D connected to the connection means 15A and disposed in the housing 11C to provide electrical connection with the sensor 15.

In a variant, the temperature sensor 15 may be connected to a member other than a timer, for example it may be connected to a safety device that indicates, e.g. by means of a sound signal, that a predetermined critical pressure has been reached or that a predetermined critical temperature has been reached.

Advantageously, the module 6 of the cooking appliance of the invention incorporates a safety valve 16 against excess pressure which is arranged within the module 6 so that when the module 6 is fitted on or secured to the lid 2 the safety valve is in leaktight communication, via a sealing gasket 16A, with a pressure release opening 16B formed through the lid 2.

The pressure safety valve 16 is responsive to the pressure that exists inside the cooking enclosure and it is mounted to move between two stable abutment positions: a first position in which said safety valve 16 closes off communication from the cooking enclosure to the outside so long as the internal pressure is below a predetermined pressure $P_2$; and a second position in which it puts the inside of the enclosure into communication with the outside as soon as the internal pressure substantially reaches the predetermined pressure $P_2$.

The pressure safety valve 16 may be a valve driven by a weight or by a spring, or it may be a valve that is ejected by parts that melt.

Such devices are well known to the person skilled in the art and seek to provide safety against excess pressure, particularly in the event of the device for regulating cooking pressure not operating.

As an additional variant, it is possible to envisage the module 6 incorporating the means 5 for driving the at least one jaw 3.

In which case, only the at least one jaw 3 is permanently mounted on the lid 2, with mechanical interface means enabling a driving connection to be established between the at least one jaw 3 and the drive means 5 secured to the module 6.

In another variant, the module 6 incorporates the at least one jaw 3, the drive means 5 being secured to the lid 2, with mechanical interface means enabling a driving connection to be established between the drive means 5 and the at least one jaw 3 secured to the module 6.

In a preferred variant, the module 6 incorporates both the drive means 5 and the at least one jaw 3, with the lid 2 thus being reduced to a part that is very simple, possibly provided with means for guiding the drive means 5.

Advantageously, the at least one jaw 3 is mounted to move in translation by at least one respective drive arm 5 between the locking position and the unlocking position.

Preferably, the at least one jaw 3 is mounted to move in translation in a direction that is substantially radial. The device 7, 8, 17 for controlling locking and unlocking may be of any type known to the person skilled in the art, for example it may be similar to one of those described in patent application WO 96/01069 in the name of the same Applicant, i.e. comprising a member 7 for controlling displacement of the jaws 3 which are mounted to move radially, and engaging the drive means 5 so as to control radial displacement thereof.

In particularly advantageous manner, the device for controlling locking and unlocking comprises a main control member 7 mounted to move in translation and an intermediate transmission part 17 mounted to turn freely relative to the main control member 7 and to the drive means 5 so as to be turned by the main control member 7 in order to engage the drive means 5 and govern displacement thereof.

Advantageously, the module 6 of the cooking appliance of the invention incorporates opening/closing safety means 21 of the finger or check valve type. These opening/closing safety means 21 are arranged within the module 6 so that, when the module 6 is fitted on and secured to the lid 2, these means are in leaktight communication via a gasket 21A with a safety opening 21B formed in the lid 2.

The position of the safety means 21 is responsive to the pressure or the temperature that exists inside the cooking enclosure. The safety means 21 are mounted to move between two stable abutment positions: a first position in which said safety means 21 put the inside of the enclosure into communication with the outside below a predetermined internal pressure $P_3$; and a second position in which they close communication from the enclosure to the outside once the pressure $P_3$ has been reached, so as to enable the pressure inside the appliance to rise and cooking to take place.

Such opening/closing safety means are well known to the person skilled in the art and make it possible to ensure that the lid is indeed in a stable locked position on the vessel, the safety means being able to move under the effect of pressure only if said stable locking position has indeed been reached.

This makes it possible to avoid pressure rising when the wrong locking position is reached. Conversely, the provision of such opening/closing safety means prevents the appliance being opened at the wrong moment, i.e. while residual pressure remains inside the appliance, since only the low position of the safety means 21 allows the appliance to be open. Preferably, the opening/closing safety means 21 are constituted by a pressure gauge rod system of the Aroma finger type.

Figure 3:
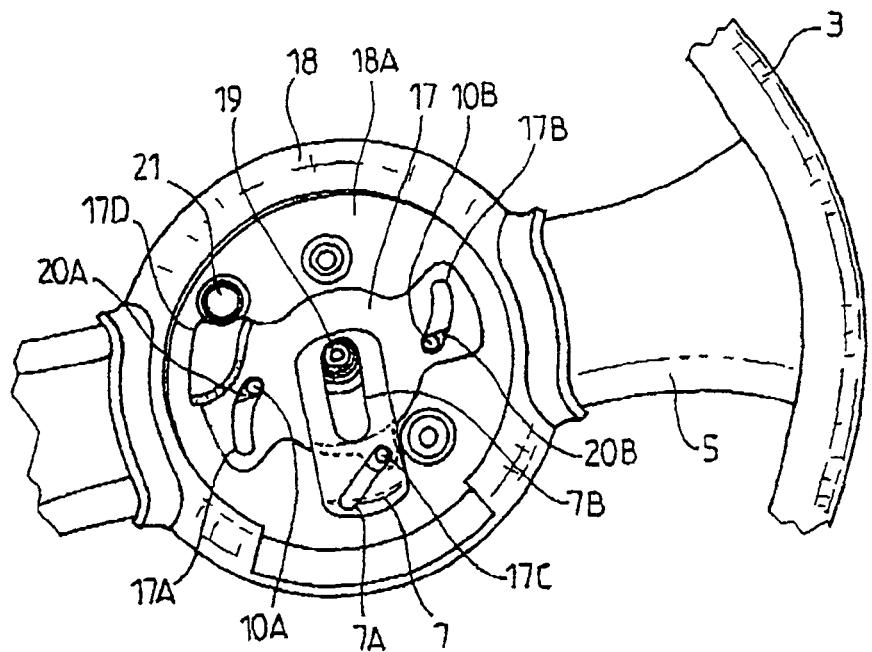
FIG. 3 is a fragmentary diagrammatic view in perspective showing an embodiment detail of the device for controlling locking and unlocking of the lid of a pressure cooker in accordance with the invention.

Advantageously, the intermediate transmission part 17 is shaped in such a manner as to co-operate with the safety means 21 so that the safety means prevent the intermediate transmission part 17 from turning freely, and thus prevent the lid 2 form being unlocked while the internal pressure is greater than or equal to the pressure $P_3$, as shown in FIG. 3.

Preferably, the intermediate transmission part 17 is also shaped so as to prevent the safety means 21 from reaching the position in which it closes off communication between the enclosure and the outside so long as the intermediate transmission part 17 is in a position other than its position that corresponds to locking.

Preferably, and as shown in FIG. 3, the edge 17D of the intermediate transmission part 17 which is in the vicinity of the safety finger 21 presents an inwardly-curved shape which is similar to a concave configuration, so as to allow the safety finger 21 to move freely through a vertical stroke. Once the finger 21 is in its high abutment position, the intermediate transmission part 17 is no longer free to turn, since it is blocked by the edge 17D pressing against the side of the finger 21.

When the jaws 3 are not in the closed position, the intermediate transmission part 17 is not in the configuration shown in FIG. 3, but is in a position where the edge 17D overlies the safety finger 21 partially or completely, such that it cannot travel freely along its vertical stroke without coming into abutment against the edge 17D. Thus, under such circumstances, the safety finger 21 is incapable of reaching its high abutment position in which it closes off communication between the enclosure and the outside.

Thus, the pressure inside the cooking appliance cannot rise normally when the intermediate transmission part 17 is in a position other than its position corresponding to the jaws 3 being locked.

The use of a rotary intermediate transmission part is thus found to be particularly advantageous, since it suffices to block this part in order to block the jaws. The intermediate transmission part thus contributes to making it easier to integrate the opening/closing safety means 21 in the module 6.

Advantageously, the module 6 of the cooking appliance of the invention incorporates bistable leakage means which are arranged within the module 6 so as to be in leaktight communication with a leak opening formed through the lid.

The bistable leakage means is suitable firstly for taking up an open position allowing air to leak from inside the cooking enclosure to the outside, and also a closed position corresponding to no leakage of air to the outside.

Such systems are well known to the person skilled in the art. They govern the progressive rise in temperature and/or pressure and enable a quantity of an air/steam mixture to be exhausted away from the gaseous cooking medium so as to optimize the cooking of food, i.e. so as to enable cooking to take place quickly while preserving the nutritional qualities of food, in particular vitamin contents.

Preferably, the bistable leakage means are means for venting air from the appliance, i.e. means which make it possible in controlled manner to vent air as completely as possible from the pressure appliance. The general principle of such a vent system relies on making calibrated leak means enabling air to escape up to a given temperature or pressure at which the leak means close. From that moment onwards, the simultaneous rise in pressure and temperature within the appliance enables a short total cooking time to be achieved.

Such systems are well known to the person skilled in the art. Thus, the bistable calibrated leak means usable in the context of the invention can be suitable for taking firstly an open position in which the continuous rise in pressure in the appliance above a determined pressure $P_4$ is allowed, while allowing air to be vented from the appliance, or else a closed position corresponding to no leakage of air to the outside, said open position being maintained for a predetermined time interval $\Box t$ after $P_4$ has been reached (or the corresponding temperature $T_4$), or until predetermined pressure or temperature values have been reached inside the appliance respectively $P_5$ and $T_5$, where $P_5 > P_4$ and $T_5 > T_4$.

Advantageously, the bistable leakage means are integrated in the opening/closing safety means 21. Thus, in the event that the safety means 21 comprise a pressure gauge rod, the bistable leakage means may be integrated in said pressure gauge rod and may include, as its moving shutter element, a bimetallic strip supported by said pressure gauge rod.

The module 6 can be releasably secured to the lid 2 by any known fastener means, for example a one-fourth turn type system or a wedging-key type system.

Preferably, the module 6 is secured to the lid 2 via a screw and nut system 22, 23 that tightens progressively, co-operating with a fixing opening 22B formed in the lid 2.

Preferably, the fixing opening 22B is provided substantially in the center of the lid 2.

In order to seal this releasable fastening, the screw or threaded shaft 22 is preferably encircled by a sealing gasket 22A.

It is preferable for the nut 23 to be positioned inside the lid, since that ensures that the module 6 can be separated only when the pressure cooker is open, thus ensuring greater safety in use. The progressive nature of the clamping makes it possible to obtain safety by gradual decompression, in the event of unscrewing taking place while the appliance is under pressure.

In particularly advantageous manner, the module 6 is secured to the lid 2 at a single point, preferably in the center thereof, which center corresponds to the zone in which the lid 2 is deformed to the greatest extent under the action of pressure. Such a configuration makes it possible to provide ultimate safety against excess pressure. When the pressure inside the pressure cooker rises, the lid 2 bulges and presents a maximum deflection which may be several millimeters in its center, thereby taking with it the module 6 at that position. Since the module is fixed to a single point at the center of the lid 2, it does not itself deform in the same way as the lid 2, such that if the lid deforms excessively, as can happen when abnormally high excess pressure occurs internally, one or more safety regulator control or driving members mounted within the module will be moved away from the corresponding opening(s) formed through the lid 2 so as to cease being in leaktight communication therewith, thus allowing steam to leak out, and thus allowing pressure to leak from the inside of the cooking enclosure.

The value of the internal pressure at which this ultimate safety feature against excess pressure comes into operation can be adjusted by acting on various parameters, including:
  the distance between the point where the module 6 is secured to the lid 2 and the opening(s) formed through the lid;
  the position on the lid 2 of the point where the module 6 is fastened, and of the opening(s) in the lid (2);
  the mechanical and geometrical properties of the lid 2 (modulus of elasticity, shape, . . . ); and
  the fixing height(s) of the valve-forming means in the module 6.

It is particularly advantageous for pressure leakage to be caused by the lid 2 deforming in its elastic range. Thus, the lid of the pressure cooker is not damaged by irreversible plastic deformation, nor is it broken, and it can be used again, once the cause of the excess pressure has been identified and cured.

A particularly advantageous embodiment of the pressure cooker of the invention is described below.

In this particularly advantageous version of the cooking appliance in accordance with the invention, there are two jaws 3 which are mounted to move radially on the lid 2, preferably in opposition to each other, by two respective drive arms 5 between the locking position and the unlocking position. Each of said drive arms 5 is provided with an axial guide stud 10A, 10B. The drive arms 5 may present sufficient length to enable them to be superposed, at least in part, during their radial displacement. Under such circumstances, the drive arms 5 are automatically guided radially one within the other, a first arm forming a male arm and the other a female arm, the male arm sliding in the female arm.

Preferably, the linear and radial movement of the drive arms 5 is guided by additional guide means secured to the lid 2. In a preferred variant, the additional guide means are formed by a support part 25 which surrounds the drive arms 5 over a fraction of their length.

In even more preferred manner, the support part 25 is formed by a channel-section plate overlying and surrounding the drive arms 5, the inside face of the web of the channel section facing towards the lid 2. Under such circumstances, there is no need for the drive arms to be superposed or to contact each other.

Advantageously, the drive means 5 are mounted to slide elastically relative to the lid 2 so that the elastic return position corresponds to the at least one jaw 3 being locked.

In the preferred circumstance in which the drive means 5 is formed by two drive arms guided in translation and mounted in opposition, it is advantageous to connect the respective inside ends of said arms by resilient return means (not shown in the figures), e.g. a spring which is arranged to return the drive arms towards each other, each moving radially in a centripetal direction. Under the effect of this return force, the jaws 3 are thus maintained in a stable locking position.

Preferably, the guide studs 10A, 10B are constituted by cylindrical pegs and are situated at the ends of the drive arms 5 that are closer to the center of the lid 2.

Advantageously, the module includes a seat 18 presenting an inside face 18A and an opposite outside face 18B, which outside face 18B provides the interface with the lid 2 when the module 6 is fitted on and secured to the lid. Said seat 18 is provided:
  with the excess pressure safety valve 16;
  with the pressure regulator valve 12, provided with a user-adjustable rating system 14;
  with a steam outlet duct 13 beginning downstream from the pressure regulator valve 12 and having the temperature sensor 15 mounted in the vicinity thereof; and
  with a one-piece assembly including the air venting means integrated in the pressure gauge rod 21.

The various valves or safety members mentioned above preferably project from the outside face 18B. This provides a function of verifying that the module 6 is properly positioned. When the module 6 is wrongly positioned on the lid 2, the male means constituted by the various above-mentioned valves are not in register with the corresponding openings 12B, 16B, 21B, which prevents the module 6 from being mounted on the lid 2.

The seat 18 is also provided with a fixing pin 22 extending substantially from the outside face 18B, preferably from the center thereof, so as to secure the module 6 releasably to the lid 2. This fixing pin 22 is encircled by a sealing gasket 22A so as to provide a connection that is leaktight by co-operating with the fixing opening 22B.

The seat 18 also includes a mounting pin 19 extending substantially from the inside face 18A, and preferably from the center thereof. This mounting pin 19 has rotatably mounted thereon a turning plate 17 that acts as an intermediate transmission part, which turning plate 17 is provided with two oblong drive slots 17A, 17B disposed symmetrically about the assembly pin 19. Said oblong drive slots 17A, 17B may be rounded in shape substantially constituting circular arcs, as shown in FIG. 3.

Figures 6, 7:
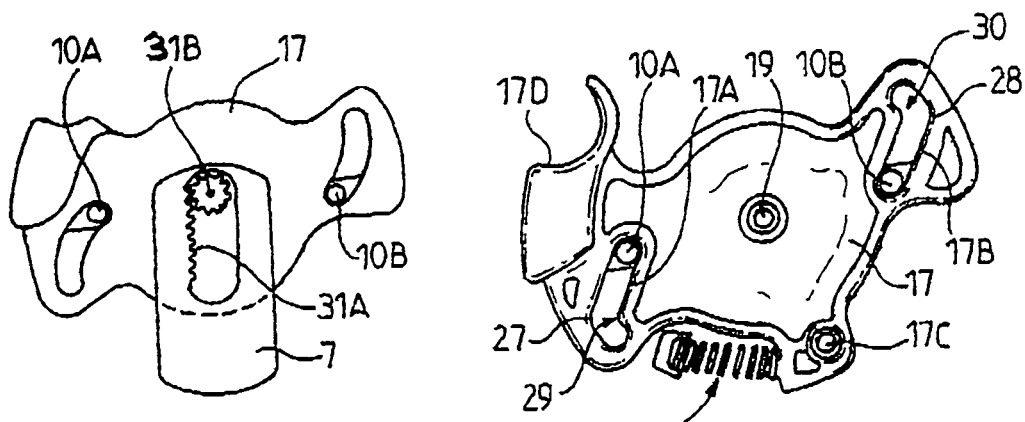
FIG. 6 shows a variant embodiment of a portion of the device for controlling locking and unlocking of the lid of a pressure cooker in accordance with the invention.
FIG. 7 shows an embodiment detail of a variant of a device for controlling locking and unlocking of the lid of a pressure cooker in accordance with the invention.
Figure 8:
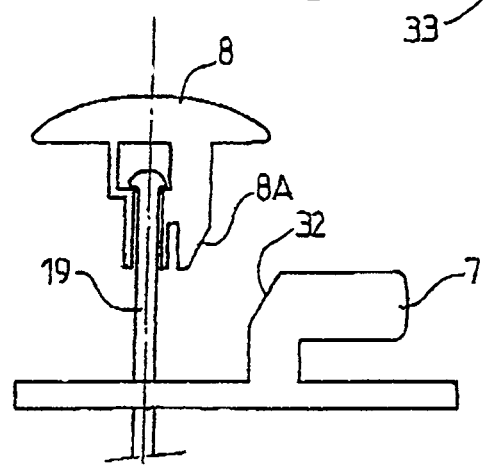
FIG. 8 is an outline diagram showing an embodiment detail of the device for controlling the movement of the jaws of a pressure cooker in accordance with the invention.

In a preferred embodiment of the invention, as shown in FIG. 7, each of the oblong drive slots 17A, 17B comprises a substantially rectilinear portion extending obliquely relative to the radial direction, said rectilinear portion forming a bend 27, 28 at one of its ends directed towards the inside of the plate 17, i.e. towards its axis of rotation.

The oblong drive slots 17A, 17B are thus substantially L-shaped, but the limbs of the L-shape form an obtuse angle (greater than 90°) between each other, and preferably a wide-open angle.

The oblong drive slots co-operate respectively with two rectilinear oblong slots 19A, 19B formed radially in the seat 18 to define two openings 20A, 20B for engaging each of said guide studs 10A, 10B. Preferably, the engagement openings 20A, 20B are in alignment with the pivot point of the turning plate 17.

Such an arrangement thus provides particularly simple and compact mechanical interfacing between the module 6 and the lid 2. Advantageously, the seat 18 is also provided with an opening pushbutton 7 constituting main control means, said opening pushbutton 7 being mounted to move radially relative to the assembly pin 19, and forming a radial pusher.

Preferably, the opening pushbutton 7 is guided to move in radial translation by a guide slot 7B, itself guided by the assembly pin 19. The opening pushbutton 7 includes an oblong drive orifice 7A, which extends obliquely relative to the radial direction, and which co-operates with a guide peg 17C secured to the turning plate 17, so that radial displacement of the opening pushbutton 7 causes the turning plate 17 to turn, thereby causing the engagement openings 20A, 20B to move radially, which openings entrain the guide studs 10A, 10B, and thus the arms 5 and the jaws 3 into the unlocking position.

In a variant, it is also possible to replace the drive system formed by the oblong drive orifice 7A and the guide peg 17C by a drive system comprising a rack 31A arranged on one of the sides of the guide slot 7B. As shown in FIG. 6, said rack 31A is positioned so as to co-operate with a pinion 31B secured to the turning plate 17 at its pivot point, and is preferably about the axis of symmetry X-X'.

Thus, the presence of a rotary intermediate part enables the radial movement of the opening pushbutton 7 to be transformed into movement of the jaws in either radial direction. The configuration shown in FIG. 3 is given purely by way of example. The angle deflector function performed by the turning plate 17 can be implemented regardless of the direction in which the opening pushbutton 7 moves radially relative to the jaws 3.

The turning plate 17 also makes it possible to reduce the amount of force a user needs to exert on the pushbutton 7 in order to move the jaws 3.

This force reduction depends on the ratio between firstly the distance between the oblong drive orifice 7A and the assembly pin 19, and secondly the distance between the engagement openings 20A, 20B and the assembly pin 19.

The amount of force reduction can thus easily be adjusted by varying the above-mentioned distance parameters.

Advantageously, the intermediate transmission part 17 is mounted to turn elastically relative to the lid 2 so that its elastic return position corresponds to the at least one jaw 3 being locked.

Preferably, the intermediate transmission part 17 is mounted to turn elastically against a compression spring 33, as shown in FIG. 7. One of the ends of the compression spring 33 is thus secured directly or indirectly to the lid 2, while its other end engages the intermediate transmission part 17, thereby exerting a force that is substantially tangential on the periphery of said intermediate transmission part 17, so as to maintain it in its position corresponding to the at least one jaw 3 being locked.

Preferably, the turning plate 17 includes means 29, 30 for reversibly blocking turning thereof when it is in the unlocking position.

In particularly advantageous manner, and as shown in FIG. 7, the oblong drive slots 17A, 17B are shaped to present respective bends 27, 28, which bends 27, 28 form the reversible blocking means 29, 30. Each bend 27, 28 includes a respective ridge 29, 30 forming an abutment suitable for constituting reversible blocking means for holding the drive means 5 in the unlocking position. Under the action of the force from the return spring interconnecting the drive arms 5, the guide studs 10A, 10B are subjected to centrifugal force which, in co-operation with the respective setback forming the ridges 29, 30 enables the intermediate transmission part 17 to be blocked in a stable unlocking position.

This unlocking position is released by exerting thrust on an axially movable closure pushbutton, constituting an axial pusher 8. A sloping surface 8A forming part of the axial pusher 8 pushes against a complementary surface 32 associated with the radial pusher 7, and the force exerted is sufficient to move the radial pusher 7 by a "wedge" effect far enough to ensure that the guide studs 10A, 10B to beyond the respective ridges 29, 30 and subsequently complete their strokes automatically under the combined effects of the compression spring 33 and the drive arm return spring, until they reach the opposite ends of the drive oblong slots 17A, 17B so as to reach a stable locking position, as shown in FIG. 7. Preferably, the axial pusher 8 is subjected to the action of resilient means, e.g. an axial compression spring (not shown) which keeps it at rest in a high position, i.e. in a position where the engagement surface 8A does not co-operate with the complementary surface 32.

The device for controlling locking and unlocking is thus preferably a system that returns automatically to the closed position, under the effect of the user acting on the trigger-forming axial pusher.

The module 6 also includes a top cap 26 which covers the seat 18 and all of the elements that are mounted thereon. The cap 26 includes at least a housing 11C for receiving the timer 11, provided with at least one electrical connection tab 11D functionally connected to the temperature sensor 15. The top cap 26 also includes the axially movable closure pushbutton 8 which includes release means for releasing the reversible blocking means that prevent the turning plate 17 from turning.

Advantageously, the module 6 is shaped overall so as to be capable of being used as a knob for taking hold of the lid 2 while it is mounted on the lid.

In an additional variant, it is naturally also possible, without going beyond the ambit of the invention, to make a device for controlling locking and unlocking which comprises a single main control member capable on its own of causing the drive arms 5 to move in both radial directions.

The drive arms 5 and the jaws 3 may also include trim-forming plates covering them overall, said trim-forming plates being shaped so as to ensure continuity with the module 6 both in terms of appearance and of protection, when the module 6 is fitted on and secured to the lid 2.

The cooking appliance in accordance with the invention operates as follows.

Putting the module 6 into place on the lid 2 requires the fixing pin 22 to be caused to penetrate into the corresponding opening 22B formed in the lid 2. The regulator valve 12, the one-piece assembly including the safety finger and the vent means 21, and the excess pressure safety valve 16 then engage correspondingly respectively in the regulator opening 12B, the safety opening 21B, and the decompression opening 16B, these openings being disposed in a non-symmetrical manner so as to ensure that the module 6 can take up only one position.

Thereafter, the module 6 is fastened to the lid 2 by screwing on the nut 23 from the inside side of the lid 2. The nut 23 is preferably shaped so as to be capable of being tightened by hand.

Under the action of the return spring interconnecting the drive arms 5, the vertical guide studs 10A, 10B are situated at rest in a position that corresponds to the jaws 3 being closed, i.e. they are in their position that is closest to the center of the lid 2.

Under the effect of the compression spring connecting it to the seat 18 of the module 6, the turning plate 17 is positioned, at rest, in a position such that the openings 20A, 20B are situated respectively in register with the axial guide studs 10A, 10B.

Thus, while the module 6 is being docked on the lid 2, the axial guide studs 10A, 10B penetrate respectively into the engagement openings 20A, 20B, thus providing the dynamic function between the control pushers 7, 8 and the drive arms 5 and the jaws 3.

Putting the lid 2 into place on the vessel 1 requires the jaws 3 to be opened, which is done by moving the opening radial pusher 7 radially in a centripetal direction. The progressive movement of the pusher 7 enables the peg 17C to be caused to slide in the drive slot 7A, thus having the effect of turning the turning plate 17 in a clockwise direction. When the plate 17 turns, it causes the guide studs 10A, 10B to slide along the curvilinear slots 17A, 17B formed in the plate 17, with the displacement of the guide studs 10A, 10B being otherwise limited in a lateral direction by the rectilinear slots 19A, 19B formed radially in the seat 18 of the module 6. The studs 10A, 10B are thus driven solely in radial translation towards the periphery of the pressure cooker in a centrifugal direction. Since the studs 10A, 10B are connected to the drive arms 5, these arms slide radially until the jaws 3 are in the open position. Once this position has been reached, the guide studs 10A, 10B co-operate with the corresponding bends 27, 28 in the slots 17A, 17B. The jaws 3 are thus in a stable unlocking position, thereby enabling the lid 2 to be centered on the edge of the vessel 1.

The cooking enclosure is closed, i.e. the jaws 3 are moved into their locking position, by pressing the palm of the hand down onto the axial button 8. When it is depressed it causes the radial pusher 7 to move radially in a centrifugal direction by interaction between the complementary sloping surfaces 8A and 32 associated respectively with the axial pusher 8 and with the radial pusher 7. The centrifugal displacement of the radial pusher 7 causes the turning plate 17 to turn in the counterclockwise direction by the peg 17C co-operating with the drive slots 7A, and as a result the guide studs 10A, 10B are released from the reversible blocking means 29, 30, thus enabling the plate 17 to return elastically under drive from the compression spring 33 and from the return springs of the drive arms, so that the jaws 3 are returned into their stable locking position.

Figure 5:
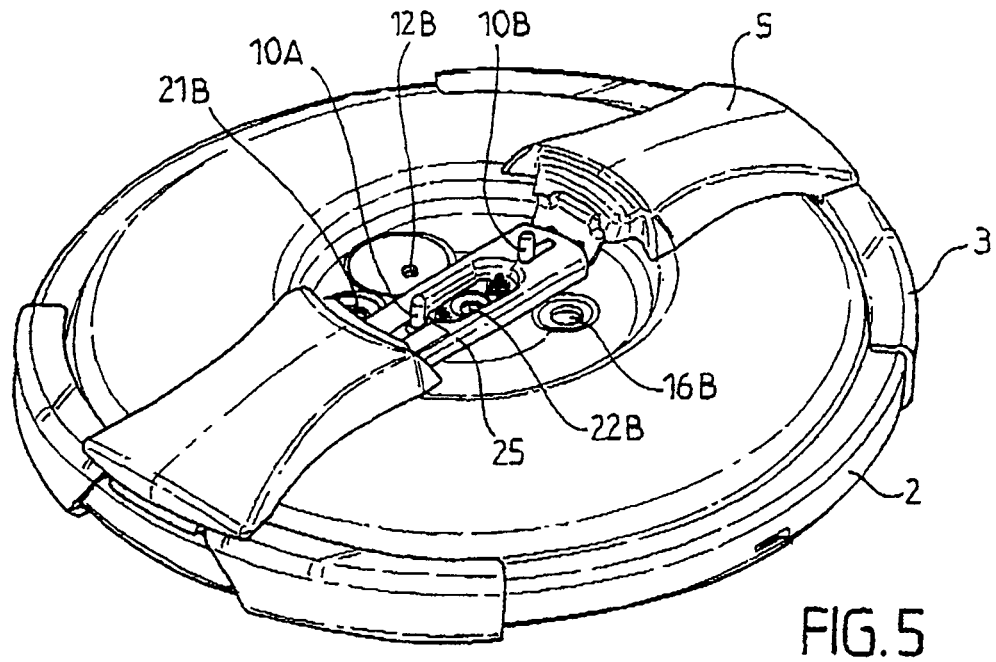
FIG. 5 is a perspective view showing a lid of a pressure cooker in accordance with the invention.

Thus, it is easy to remove the module 6 in which all of the functions for the user are grouped together, thereby making it possible to obtain a "bare" lid 2 as shown in FIG. 5. The lid 2 which is made mostly out of metal parts can then be washed in a dishwasher, independently of the module 6, which module in any event is much less subjected to dirtying than the lid 2 since it is positioned on the outside of the lid while the pressure cooker is in operation.

SUSCEPTIBILITY OF INDUSTRIAL APPLICATION

The industrial application of the invention lies in the design and manufacture of domestic appliances for cooking under pressure, and in particular pressure cookers.

Therefore, having thus described the invention, at least the following is claimed:

1. An appliance for cooking food under pressure, the appliance comprising at least a vessel (1) and a lid (2) for being fitted and locked on said vessel (1) in order to form a leaktight cooking enclosure, the appliance having a module (6) incorporating at least a member (12, 16, 21) which is arranged within the module (6) so as to be in leaktight communication with a corresponding opening (12B, 16B, 21B) formed through the lid (2), said module (6) being fixedly secured to the lid (2) such that it is prevented from being vertically displaced relative to the lid and in such a manner that if an abnormally high excess pressure occurs in the cooking enclosure, then the lid (2) is deformed under the action of pressure such that said member (12, 16, 21) is moved away from said corresponding opening (12B, 16B, 21B) so as to cease being in leaktight communication therewith, thus allowing steam to leak out.

2. A cooking appliance according to claim 1, in which said module (6) is a module (6) for fitting on and releasably securing to the lid (2).

3. A cooking appliance according to claim 1, in which said module (6) is secured to the lid (2) at a single point.

4. A cooking appliance according to claim 3, in which said module (6) is secured to the lid (2) in the center thereof.

5. A cooking appliance according to claim 1, in which the module (6) is fixed to the lid (2) by means of a screw-and-nut system (22, 23) that tightens progressively in co-operation with a fastening opening (22B) formed through the lid (2).

6. A cooking appliance according to claim 5, in which said the fastening opening (22B) is formed substantially at the center of the lid (2).

7. A cooking appliance according to claim 1, in which said lid (2) bulges under the action of pressure in the cooking enclosure.

8. A cooking appliance according to claim 1, in which said pressure leakage is caused by the lid (2) deforming in its elastic range.

9. A cooking appliance according to claim 1, in which said member (12, 16, 21) includes a pressure regulator valve (12):
   which is arranged within the module so as to be in leaktight communication with a regulator opening (12B) formed through the lid (2);
   which is responsive to the pressure that exists inside the cooking enclosure; and
   which is mounted to move between two stable abutment positions, a first position in which it closes off communication from the enclosure to the outside so long as the internal pressure is less than a predetermined pressure $P_1$, and a second position in which it puts the inside of the enclosure into communication with the outside via a steam outlet (13) as soon as the internal pressure reaches substantially the predetermined pressure $P_1$.

10. A cooking appliance according to claim 1, in which said member (12, 16, 21) includes an excess pressure safety valve (16):
   which is arranged within the module (6) so as to be in leaktight communication with a pressure relief opening (16B) formed through the lid (2);
   which is responsive to the pressure that exists inside the cooking enclosure; and
   which is mounted to move between two stable abutment positions, a first position in which said safety valve (16) closes off communication from the enclosure to the outside so long as the internal pressure is below a predetermined pressure $P_2$, and a second position in which it puts the inside of the enclosure into communication with the outside as soon as the internal pressure reaches substantially the predetermined pressure $P_2$.

11. A cooking appliance according to claim 1, in which said member (12, 16, 21) includes opening/closing safety means (21) which are arranged within the module (6) so as to be in leaktight communication with a safety opening (21B) formed through the lid (2), the position thereof being responsive to the pressure or the temperature that exists in the cooking enclosure, said safety means (21) being mounted to move between two stable abutment positions, a first position in which said safety means (21) puts the inside of the enclosure into communication with the outside below a predetermined internal pressure $P_3$, and a second position in which it closes off communication from the enclosure to the outside when the pressure $P_3$ is reached, in order to enable the pressure inside the appliance to rise and cooking to take place.

12. A cooking appliance according to claim 1, in which said member (12, 16, 21) includes bistable leakage means:

which are arranged within the module so as to be in leaktight communication with a leak opening formed through the lid; and which are suitable for taking up firstly an open position allowing air to leak from the inside of the cooking enclosure to the outside, and a closed position corresponding to no leakage of air to the outside.

13. A cooking appliance according to claim 1, in which said module (6) comprises a seat (18) presenting an inside face (18A) and an opposite outside face (18B), which outside face (18B) provides the interface with the lid (2), said seat (18) being provided with said member (12, 16, 21).

14. A cooking appliance according to claim 13, in which said seat (18) is provided with a fixing pin (22) extending substantially from the outside face (18B), preferentially from the center thereof, in order to secure the module (6) releasably to the lid (2).

\* \* \* \* \*